US012791906B2

(12) United States Patent
Aimone et al.

(10) Patent No.: US 12,791,906 B2
(45) Date of Patent: Nov. 10, 2026

(54) OPTICAL WAVEGUIDE MODULATOR

(71) Applicant: Nokia Solutions and Networks Oy, Espoo (FI)

(72) Inventors: Alessandro Aimone, Berlin (DE); Philipp Thomas, New Providence, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 275 days.

(21) Appl. No.: 18/582,035

(22) Filed: Feb. 20, 2024

(65) Prior Publication Data

US 2025/0264772 A1 Aug. 21, 2025

(51) Int. Cl.
*G02F 1/225* (2006.01)
*G02F 1/21* (2006.01)

(52) U.S. Cl.
CPC ............ *G02F 1/2255* (2013.01); *G02F 1/212* (2021.01); *G02F 2202/20* (2013.01)

(58) Field of Classification Search
CPC ..... G02F 1/212; G02F 1/2255; G02F 2202/20
See application file for complete search history.

(56) References Cited

U.S. PATENT DOCUMENTS 5,278,924 A * 1/1994 Schaffner .............. G02F 1/0356 385/9
6,580,840 B1 6/2003 McBrien et al.
6,961,166 B2 11/2005 Wooten et al.
7,212,326 B2 * 5/2007 Wooten .................. G02F 1/225 359/279
8,873,896 B1 10/2014 Kissa
12,181,770 B2 * 12/2024 Villa ...................... G02F 1/212
2005/0094917 A1 * 5/2005 Wang .................... B82Y 20/00 385/39

(Continued)

FOREIGN PATENT DOCUMENTS

EP 4080272 A1 * 10/2022 ............ G02F 1/025

OTHER PUBLICATIONS

C. J. Grant, R. O. Mueller and N. Mysoor, "A high data rate electro-optic phase modulator driver for a coherent optical communications application," Proceedings of 1994 IEEE Aerospace Applications Conference Proceedings, Vail, CO, USA, 1994, pp. 223-229.

(Continued)

*Primary Examiner* — Daniel Petkovsek
(74) *Attorney, Agent, or Firm* — Brake Hughes Bellermann LLP

(57) ABSTRACT

An optical modulator assembly includes an RF drive circuit and a photonic integrated circuit (PIC) arranged on a substrate. The PIC includes an RF transmission line formed with a pair of drive electrodes, an optical waveguide extending between and along the drive electrodes of the pair. The RF drive circuit is electrically connected to drive the RF transmission line to modulate light propagating in the optical waveguide. The RF transmission line and the optical waveguide are propagation velocity mismatched. The RF drive circuit is configured to cause the optical modulator assembly to have a peaking in an electrical frequency response thereof to compensate for a propagation velocity mismatch between the RF transmission line and the optical waveguide.

15 Claims, 9 Drawing Sheets

100

1000

(56) References Cited

U.S. PATENT DOCUMENTS

2021/0080797 A1 3/2021 Kissa et al.

OTHER PUBLICATIONS

Sudip Shekhar, Jeffrey S. Walling, and David J. Allstot, "Bandwidth Extension Techniques for CMOS Amplifiers", IEEE Journal of Solid-State Circuits, vol. 41, No. 11, Nov. 2006, pp. 2424-2439.

* cited by examiner

OPTICAL WAVEGUIDE MODULATOR

TECHNICAL FIELD

The present invention relates to integrated optical devices including optical waveguide modulators.

BACKGROUND

Data center interconnects and broad-band telecom networks make use of optical communication modules to process the high data rates of internet traffic. Optical transceiver capable of high data rates typically use travelling-wave (TW) optical waveguide modulators, such as Mach-Zehnder modulators (MZMs) having optical waveguide arms extending along traveling-wave electrodes (TWE). Using optical materials having a large Pockels effect, such as e.g. lithium niobate (LiNbO3, "LN"), in the waveguide arms of an MZM enables providing data rates in excess of 100 Giga-bit/second (Gbs). A thin-film lithium niobate (TFLN) MZM, which combines superior electro-optic properties of lithium niobate with silicon photonics (SiP), may be implemented as a photonic integrated circuit (PIC) in a SiP chip. An MZM PIC is typically combined with an electrical integrated circuit (EIC) of an RF driver. Specifications of a TW-MZM, e.g. drive voltage and bandwidth, typically involve trade-offs between multiple design requirements, such as the EIC to PIC impedance matching, electrical to optical velocity matching in the TW MZM, broadband low-loss RF signal propagation, etc.

SUMMARY

According to an example embodiment, provided is an apparatus. The apparatus includes an optical modulator assembly comprising a substrate, a photonic integrated circuit (PIC), and an RF drive circuit. The PIC is arranged on the substrate and comprises an RF transmission line comprising a pair of drive electrodes, and an optical waveguide extending between and along the drive electrodes of the pair. The RF drive circuit is electrically connected to drive the RF transmission line to modulate light propagating in the optical waveguide. The RF transmission line and the optical waveguide have a propagation velocity mismatch. The RF drive circuit is configured to cause the optical modulator assembly to have a peaking in an electrical frequency response thereof to compensate for a propagation velocity mismatch between optical and electrical signals propagating along the optical waveguide and the RF transmission line, respectively. The optical waveguide may comprise electro-optical material.

In some implementations of the apparatus, the peaking occurs near a high-frequency edge of a modulation bandwidth B of the optical modulator assembly.

In any of the above implementations, the peaking may have a height of at least 4 dB.

In any of the above implementations, a group index of the optical waveguide may differ from a group index of the RF transmission line by at least 0.2.

In any of the above implementations, the propagation velocity mismatch may be at least 10% of a group velocity of the light in the optical waveguide.

In any of the above implementations, the PIC may comprise an optical Mach-Zehnder modulator (MZM) having two optical waveguide arms connected to receive the light from an optical splitter, one of the optical waveguide arms comprising the optical waveguide. The optical waveguide arms of the MZM may comprise electro-optical material. In some of such implementations, the electro-optic material is thin-film lithium niobate.

In any of the above implementations, the RF transmission line may be configured such that the propagation velocity mismatch compensates for the peaking in the electrical frequency response to flatten an electro-optical modulation transfer function of the assembly.

In any of the above implementations, the substrate may comprise a silicon substrate, and the PIC may be arranged over a planar surface of the silicon substrate absent substrate undercutting.

An aspect of the present disclosure provides a method for modulating light in an optical waveguide modulator, the method comprising: propagating the light in an optical waveguide a velocity-mismatched RF transmission line, the velocity-mismatched RF transmission line having a propagation velocity mismatch with the optical waveguide; and using an RF driver having a peaking in a frequency response thereof to drive the velocity-mismatched RF transmission, the peaking selected to at least partially compensate for a reduction of a modulation bandwidth of the optical modulator due to the velocity mismatch. The method may comprise propagating an RF drive signal along the optical waveguide at a group velocity $v_{es}$ that is at most 90% of a group velocity of the light $v_{os}$ in the optical waveguide. In some implementations, the peaking may have a height of at least 4 dB. In any of the above implementations, the peaking may be configured to extend the modulation bandwidth of the optical modulator by at least 20%.

A related aspect of the present disclosure provides a method for fabricating and/or configuring an optical modulator assembly comprising an RF drive circuit for generating an RF drive signal, and an RF transmission line for transmitting the RF drive signal along an optical waveguide to modulate light propagating therein. The method comprises: configuring the RF transmission line to have a signal propagation velocity mismatch with the optical waveguide; and configuring the RF drive circuit to have a peak in an electrical frequency response thereof, such as to at least partially compensate for a reduction in a modulation bandwidth of the optical modulator due to the signal propagation velocity mismatch. The method of this aspect may comprise configuring the RF transmission line such that the velocity mismatch is at least 20% of a group velocity of light in the optical waveguide. In some implementations, the method may comprise configuring the RF drive circuit such that the peak has a height of at least 4 dB. Any of the above implementations of the method may comprise configuring the RF drive circuit such that a modulation transfer function of the optical modulator may be substantially monotonic in frequency. Any of the above implementations of the method may comprise configuring the RF driver such that the peak is located near a high-frequency edge of a modulation bandwidth of the modulator.

BRIEF DESCRIPTION OF THE DRAWINGS

Embodiments disclosed herein will be described in greater detail with reference to the accompanying drawings that represent example embodiments thereof, which are not to scale, in which like elements are indicated with like reference numerals, and wherein.

DETAILED DESCRIPTION OF SOME SPECIFIC EMBODIMENTS

Figure 1:
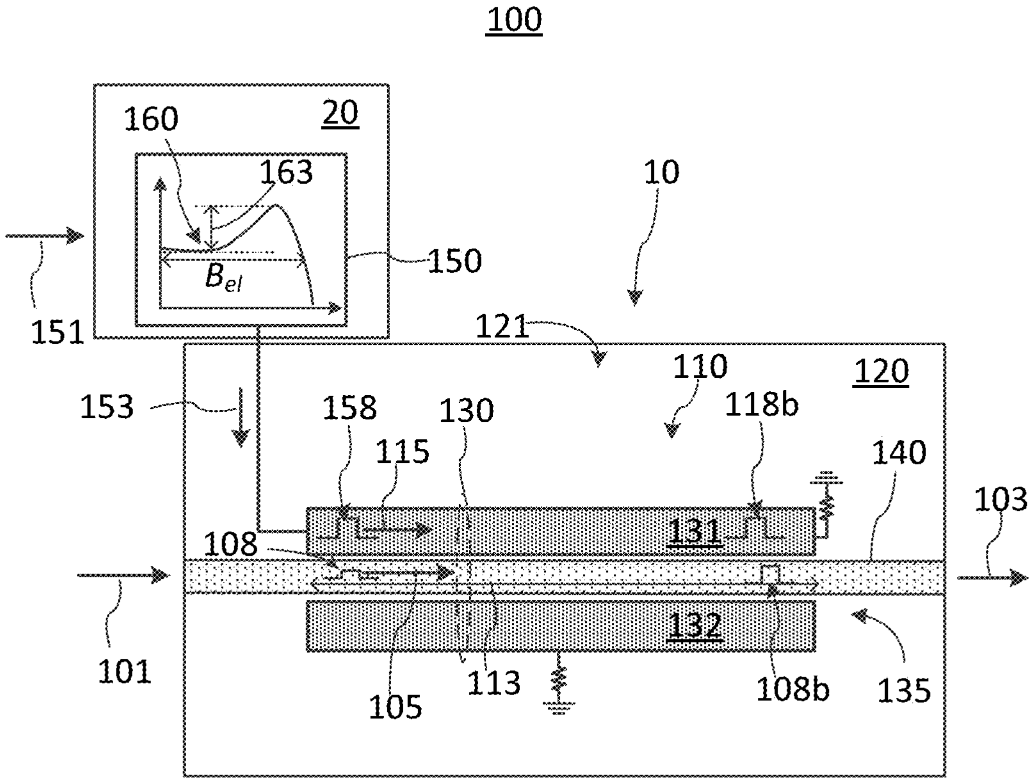
FIG. 1 is a schematic diagram illustrating a travelling-wave (TW) optical phase modulator with a velocity-mismatched drive electrode.

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits may be omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:

"CMOS" Complementary Metal-Oxide-Semiconductor
"EO" Electro-Optical
"Si" Silicon
"LN" Lithium Niobate
"LNOI" Lithium Niobate on Insulator
"TFLN" Thin-Film Lithium Niobate
"PIC" Photonic Integrated Circuit
"EIC" Electrical Integrated Circuit
"RI" Refractive Index
"SOI" Silicon on Insulator
"SiP" Silicon Photonics
"TW" Travelling Wave
"TWE" Travelling Wave Electrode Note that as used herein, the terms "first", "second", and so forth are not intended to imply sequential ordering, but rather are intended to distinguish one element from another, unless explicitly stated. Similarly, sequential ordering of method steps does not imply a requirement of sequential order of their execution, unless explicitly stated. The term "vertical" refers to a direction generally perpendicular to a surface of the substrate along which relevant integrated circuitry is disposed. The term "horizontal" refers to a direction along the surface of the substrate.

The present disclosure describes examples of TW optical waveguide modulators using velocity-mismatched TW drive electrodes to modulate light propagating in an optical waveguide. Conventionally, broad-band optical waveguide modulators with TW electrodes are designed for simultaneous impedance and velocity matching to an extent possible, since working far from impedance or velocity matching typically degrades the modulator's performance at high data rates. Here, "impedance matching" refers to matching, i.e. approximately equalizing, the output impedance of an RF driver of the modulator to the input impedance of the on-chip RF transmission line of the optical modulator formed by the TW drive electrodes thereof. "Velocity matching" refers to matching the propagation velocity of the RF drive signal along the RF transmission line of the modulator, or the constituent TW drive electrodes thereof, to the group velocity of a corresponding optical signal in the co-extending optical waveguide. In the velocity matched case, the modulation of light propagating along the optical waveguide remains in synchronization with the modulating RF drive signal along the length of their co-propagation in the modulator. However, the requirement of simultaneous impedance and velocity matching limits the design space of the TWEs of the modulator and, for a selected technology, may set an upper bound to the modulator's performance. In particular, relaxing the velocity matching requirement may open up the optical chip design space, e.g. potentially allowing to significantly simplify the optical chip manufacturing process, reducing the complexity and cost of the resulting modulator device. Example optical modulator devices described below have, in the optical modulator chip thereof, RF transmission lines that are strongly velocity-mismatched with respect to the co-extending optical waveguide, with the velocity mismatch being compensated by using an RF driver having a peaking electrical frequency response. By suitably configuring the position and amplitude of the peaking, the modulator may be made more tolerant to the velocity mismatch to provide a broadband flat modulator transfer function.

FIG. 1 schematically illustrates two main functional blocks of an optical modulator assembly 100 for modulating light 101: a photonic integrated circuit (PIC) 110 and an RF drive circuit 150 ("RF driver 150"). The PIC 110 and the RF drive circuit 150 are typically implemented as distinct structural units, e.g. chips, and assembled into one module, e.g. as described below with reference to FIGS. 7 and 8. The PIC 110 may be implemented in a photonic chip 10 along a surface 121 of a substrate 120, the surface 121 being typically approximately or roughly planar. The RF drive circuit 150 may be implemented with an electrical integrated circuit (EIC) 20, e.g. in a different EIC chip. The PIC 110 is configured as a velocity-mismatched travelling-wave (TW) optical waveguide modulator, and may be referred to herein as the modulator PIC 110. In the illustrated example, the modulator PIC 110 includes an RF transmission line 130 formed with a pair of TW drive electrodes 131, 132, and an optical waveguide 140 extending in an electrode gap between the drive electrodes over a length $l_{EO}$ 113. At least one of the drive electrodes 131, 132 is a signal electrode that is end-connected to an output of the RF driver 150.

Figure 12:
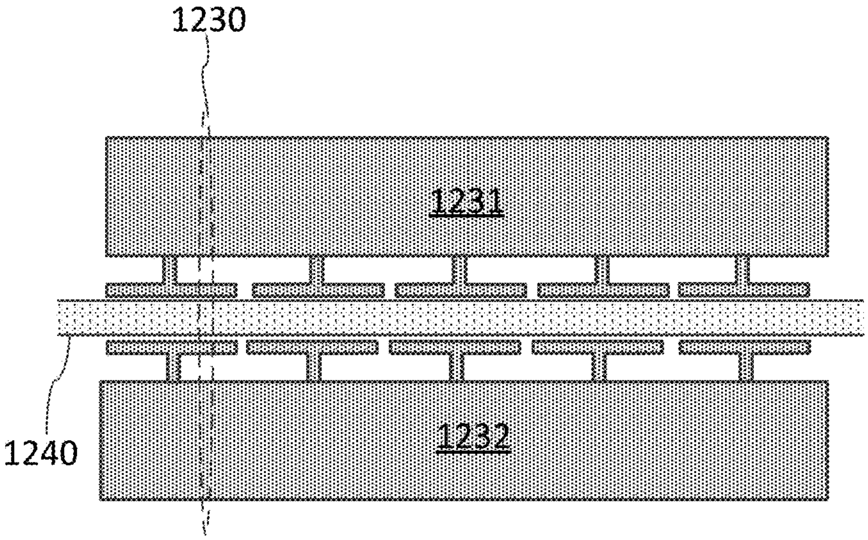
FIG. 12 is a schematic plan view of a micro-structured RF transmission line for modulating an optical waveguide.

In the illustrated example, a first end of the drive electrode 131 is electrically connected to the output of the RF driver 150. The distal end of the drive electrode 131 may be electrically terminated in order to, at least, partially suppress back reflections of the RF signal therefrom, or even to totally suppress such back reflections. For example, such an electrical termination may be a matched electrical connection to a chip ground, as schematically illustrated in FIG. 1 by way of example, or to a DC source (not shown). The electrode 132 is a ground electrode that is connected to electrical ground at one or more locations along the length of the electrode. In another example, the RF driver 150 is a differential RF driver, with both of the drive electrodes 131, 132 being TW signal electrodes having first ends connected to corresponding single-ended outputs of the differential RF driver. In some implementations, the drive electrodes 131, 132 may be capacitively-loaded micro-structured TWE electrodes, e.g. as illustrated in FIG. 12.

The optical waveguide 140 includes a core of electro-optical material, whose refractive index (RI) is electrically variable, e.g. by an applied electric field through the Pockels effect. In the examples described herein the electro-optical material is lithium niobate (LiNbO3, "LN"), but other suitable electro-optical materials, including but not limited to other ferroelectric materials or semiconductors with or without p/n junctions, may be used in other embodiments.

In operation, the RF driver 150 converts a data signal 151 into the RF drive signal 153 that is suitable for driving the RF transmission line 130. The RF drive signal 153 then propagates along the RF transmission line 130, e.g. as an RF wave 158, and modulates the light 101 in the optical waveguide 140. The length 113 over which the modulation occurs may be referred to herein as the electro-optical (EO) interaction length 113, or the EO modulation length 113 of the modulator.

The input to output conversion efficiency of the RF driver 150 may be described by an electrical frequency response (EFR) function $R_{el}(f)$, $$R_{el}(f) = 20 \cdot \log[S_{out}(f)/S_{in}(f)], \qquad (1)$$

where $f$ is an RF frequency, $S_{in}(f)$ is an amplitude of a corresponding frequency component of the data signal 151 at an input of the RF driver 150 and $S_{out}(f)$ is an amplitude of the RF drive signal 153 at the frequency $f$ at an input end of the drive electrode 130. Equation (1) may also be used to describe an EFR of the assembly 100, in which case the $S_{out}(f)$ is measured at the distal end 135 of the RF transmission line 130. The data and drive signals, 151 and 153, may be, e.g. voltage signals, with the $S_{out}(f)$ and $S_{in}(f)$ being voltage amplitudes. For TW optical modulator examples described herein, a relevant range of the RF frequency $f$ may typically be from about 0.01-0.1 GHz to about 50-150 GHz.

The data signal 151 may be a high data rate signal, such that, in a typical TW operation, a duration of one data symbol $\tau_B=1/R_B$ is comparable to, or smaller than, a propagation time $\tau_{es}=l_{EO}/v_{es}$ of the electrical RF signal 153 along the optical waveguide 140. Here, $R_B$ is the baud rate of the data signal 151, $l_{EO}$ is the EO interaction length 113, $v_{es}=c/n_{es}$ is the group propagation velocity 115 of the RF signal 153 along the drive electrode 131, c is the velocity of light in vacuum, and $n_{es}$ is the group index of an RF electromagnetic wave propagating along the electrodes 131 and 132 ("electrical group index"). The electrical group index $n_{es}$ is a characteristic of the RF transmission line 130 and depends on the geometry and materials of the electrodes and properties of the surrounding media, such as the material and geometry of the electrodes 131, 132 and the substrate 120. By way of example, the baud rate $R_B$ may be in a range from about 50 to about 150 gigabaud (GBd) or greater.

An electrical field associated with the RF wave 158 penetrates into the optical waveguide 140 and modulates a refractive index of the EO material of the waveguide, thereby inducing a modulation signal 108 in the optical phase of the light 101. This optical modulation signal propagates along the optical waveguide 140 at a group velocity $v_{os}=c/n_{os}$, where $n_{os}$ is an effective index of the optical waveguide 140 ("optical group index"). Ideally, in order to maximize the optical modulation efficiency of the device 100, the propagation velocities of the RF drive signal 153 (the RF wave 158) and the optical modulation signal 108, schematically indicated in FIG. 1 with arrows 115 and 105 respectively, should be approximately equal, so that the electrical modulating signal (the RF wave 158) and the resulting optical modulation signal 108 remain in synchronization along the whole length 113 of their co-propagation in the modulator. When the propagation time difference $\Delta\tau$ between the electrical and optical signals in the modulator exceeds a fraction of a symbol duration TB, the efficiency of the optical modulation may decrease.

In the examples described herein, the modulator PIC 110 is configured so that the RF transmission line 130 and the optical waveguide 140 are propagation velocity mismatched, such that the travel time $\tau_{os}=l_{EO}/v_{os}$ of the optical modulation signal 108 over the EO interaction length 113 ("optical travel time") substantially differs from the travel time $\tau_{es}=l_{EO}/v_{es}$ of the RF wave 158 over the same length of their co-propagation ("electrical travel time"). E.g., in a velocity-mismatched TW modulator, such as the modulator PIC 110 or the MZM modulator 220 described below with reference to FIG. 2, the difference $\Delta\tau=|\tau_{es}-\tau_{os}|$ between the optical travel time $\tau_{os}$ and the electrical travel time $\tau_{es}$ may be about or greater than a substantial fraction k of the symbol duration $\tau_B$, e.g. one third (k=⅓), or one half (k=½) in some typical implementations, so that the following condition (2) may hold:

$$\tau_B \geq k|\tau_{es} - \tau_{os}| = k \cdot L_{EO} \cdot |1/v_{es} - 1/v_{os}| \qquad (2)$$

or equivalently, $$|\Delta n| \geq \frac{k \cdot c}{R_B L_{EO}} = \frac{k \cdot \tau_B}{\tau_{air}} \qquad (3)$$

where $\Delta n=(n_{es}-n_{os})$ is the difference of the group indices for signal propagation in the optical waveguide 140 and the RF transmission line 130, $\tau_B$ is the symbol duration, and $\tau_{air}$ is the photon flight time in air along the EO interaction length 113 of the optical modulator. In an example implementation, the RF driver 150 may be configured for a target baud rate $R_B$, e.g. to have a 6 dB electrical bandwidth $B_{el}$ approximately equal the baud rate, i.e. $B_{el} \cong R_B$. The velocity mismatch condition (3) may then be written as $$|\Delta n| \geq \frac{k \cdot c}{B_{el} L_{EO}} = \frac{k}{B_{el} \tau_{air}} \tag{4}$$

By way of example, for $R_B \cong B_{el} \cong 100$ GBd and $L_{EO} \cong 0.75$ cm, k=½, conditions (3) and (4) of the velocity mismatch between the co-propagating electrical and optical signals ("electro-optical velocity mismatch") yields the group index mismatch $\Delta n \geq 0.2$. In various implementations, the optical-to-electrical group index mismatch may be in the range from about 0.2 to about 0.8, or from about 0.3 to about 0.7 in some typical examples.

In order to at least partially offset the deterioration of the optical modulation efficiency of the modulator PIC 110 caused by the electro-optical velocity mismatch, the RF driver 150 is configured to have a peaking electrical frequency response 160, as schematically illustrated in FIG. 1 within the block indicating the RF driver 150. That is, the electrical frequency response (EFR) $R_{el}(f)$ 160 of the RF driver 150, e.g. as given by equation (1), has a peak near a high-frequency edge of the bandwidth $B_{el}$ thereof, as schematically indicated in FIG. 1 at 163. The amplitude and position of the peak along the frequency axis of the EFR 160 may be selected, e.g., to maximize the EO modulation bandwidth $B_{EO}$ of the modulator and to have a roughly flat and monotonic EO modulation transfer function. Here, the modulation transfer function is the EO frequency response of the modulator assembly, e.g. from the electrical input to the RF driver 150 to the optical output of the modulator PIC 120. By way of example, the peak in the EFR 160 may have a height 163, relative to a floor of the EFR 160 at lower frequencies, in the 3 dB to 10 dB range, or in a 4 dB to 8 dB range for some typical embodiments.

Figure 2:
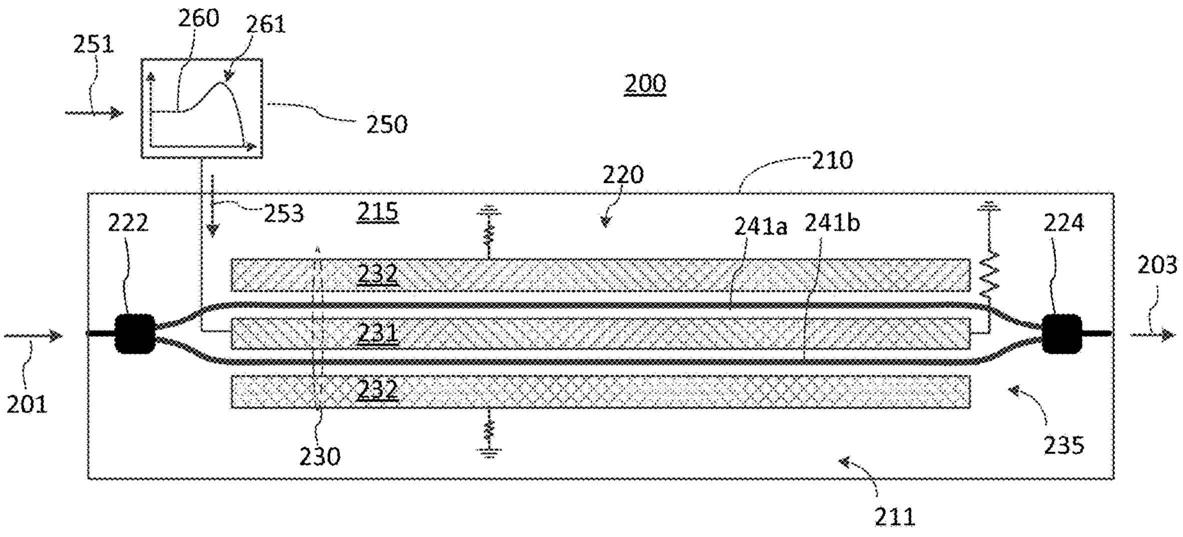
FIG. 2 is a schematic diagram illustrating an optical waveguide modulator including a velocity-mismatched TW-MZM.

FIG. 2 schematically illustrates main blocks of an example optical assembly 200 for modulating light according to a second example. The optical assembly 200 includes a planar optical Mach-Zehnder modulator (MZM) 220 and an RF driver circuit 250 ("RF driver 250") for driving the optical MZM 220 at a target data rate. The optical MZM 220 is embodied with a PIC 210 ("MZM PIC 210") and is disposed along a main surface 211 of a substrate 215. The optical MZM 220 includes two optical waveguide arms, 241*a* and 241*b*, which may be commonly referred to as the modulator arms 241. Each of the modulator arms 241 has an optical waveguide core including an electro-optical material, i.e. a material whose optical properties, e.g. the refractive index, may be varied by an applied electrical field, e.g. due to the Pockels effect. By way of a non-limiting example, the electro-optical material of the waveguide arms 241 is LN, e.g. the thin-film LN (TFLN).

The optical MZM 220 further includes a middle TW electrode 231 extending along and between the modulator arms 241, and two outer electrodes 232 extending along the modulator arms 241*a* and 241*b*, respectively, at the outer sides of the respective modulator arms 241. In this layout, each of the modulator arms 241 is located between the middle electrode 231 and one of the outer electrodes 232. Each one of the optical waveguide arms 241 may be an embodiment of the optical waveguide 140 of FIG. 1, and the middle drive electrode 231 and a corresponding one of the outer electrodes 232 may be embodiments of the electrodes 131, 132 of FIG. 1. In the example illustrated in FIG. 2, the electrodes 231, 232 form a three-electrode RF transmission line 230, with the middle electrode 231 end-connected to an output of the RF driver 250 being a TW signal electrode; the outer electrodes 232 are ground electrodes.

The modulator arms 241 are connected to receive light 201 in parallel from an optical splitter 222 and to transmit said light to an optical combiner 224, for recombination, after travelling along the modulator arms 241. In some embodiments, the optical splitter 222 and the optical combiner 224 may be formed with a different material than the modulator arms 241; e.g. the optical splitter 222 and the optical combiner 224 may be formed with silicon waveguides, while the modulator arms 241 may be TFLN ridge waveguides, or may have hybrid waveguide cores including a TFLN. In some embodiments, the optical splitter 222 and the optical combiner 224 may be located in a different layer than the modulator arms 241, and may be optically coupled to the modulator arms 241 with vertical couplers.

The PIC 210 may include other optical devices, such as e.g. other MZMs, polarization splitters, polarization combiners, optical phase shifters, etc. E.g., the MZM 220 may be a part of a nested MZM structure of an IQ modulator. The PIC 210 may also implement a dual-polarization optical modulator, e.g. including two nested MZM structures, as known in the art, arranged to receive orthogonal polarizations of light 201.

Similar to the RF driver 150 of FIG. 1, the RF driver 250 converts an input data signal 251 at a baud rate $R_B$ to an RF drive signal 253 configured to drive the RF transmission line 230. The RF transmission line 230 is configured to modulate the light 201 in the two optical waveguide arms 241 in a push-pull fashion responsive to the RF drive signal 253 propagating along the RF transmission line 230. Implementations with the middle electrode 231 split into two separate electrodes to form two parallel RF transmission lines, with the RF driver 150 configured for separately driving the two parallel RF transmission lines to modulate the light into the two waveguide arms 241 under conditions of velocity mismatch, are also possible and are within the scope of the present disclosure.

Similar to the PIC 110 of FIG. 1, the PIC 210 is configured so that the optical group velocity $v_{os}=c/n_{os}$ of the light 201 propagating along the optical waveguide arms 241 and the electrical group velocity $v_{es}=c/n_{es}$ of the RF signal 253 propagating along the RF transmission line 230 are mismatched, e.g. as described above with reference to FIG. 1 and equations (2)-(4). The RF driver 250 is configured to have a peaking 261 in the electrical frequency response 260 thereof so as to least partially compensate for the high-frequency roll-off of the electro-optical response of the PIC 210 due to the electro-optical velocity mismatch in the MZM 220, e.g. as described above with reference to the RF driver 150 and the electrical frequency response 160 and below with reference to FIGS. 3 and 4.

Figure 3:
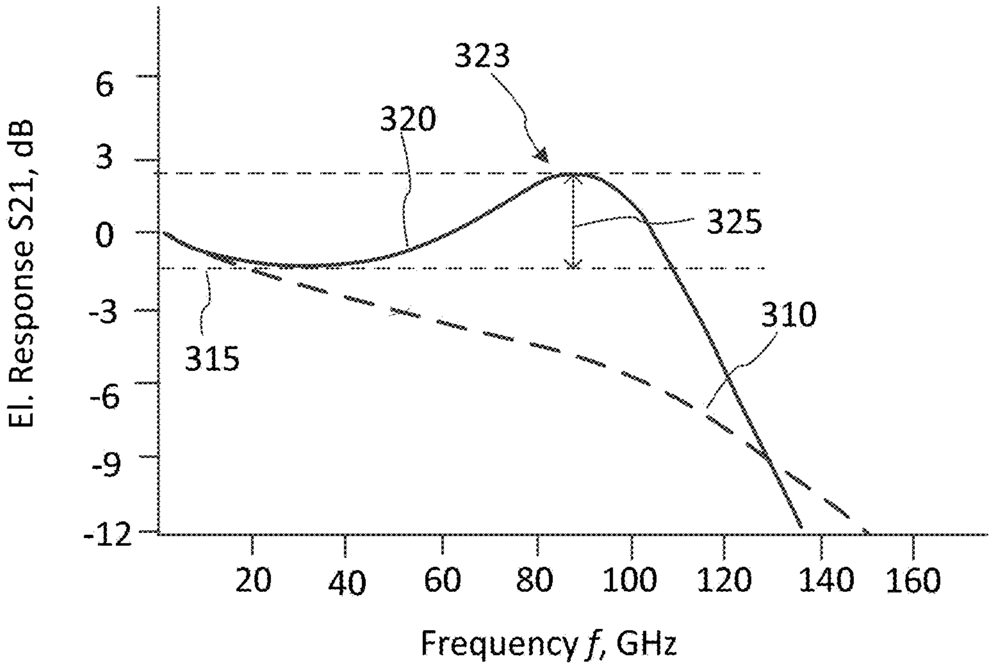
FIG. 3 is a graph illustrating example peaking and non-peaking electrical frequency responses of an RF driver of an optical modulator.

FIG. 3 illustrates an example peaking electrical frequency response 320 of the driver-modulator assembly 200. Also shown for comparison is an electrical frequency response 310 of a version of the assembly 200 with the RF driver 250 having a conventional non-peaking, i.e. monotonic, EFR with a 6 dB bandwidth of about 100 GHz. The peaking electrical frequency response 320 has a peak 323 near the high-frequency edge (444, FIG. 4) of a target modulation bandwidth $B_{EO}$ of the driver-modulator assembly 200, e.g.

typically in a $0.5B_{EO}$–$1.3B_{EO}$ range. The peak frequency may also typically be in a range from about $0.5R_B$ to about $1R_B$. In the illustrated example, the peak 323 has a height 325 of about 5 dB (relative to a floor 315 of the response at lower frequencies), with a peak value at about 90 GHz. The peaking 323 broadens the 6 dB EFR bandwidth of the driver-modulator assembly 200 by about 18 GHz in this example.

Figure 4A:
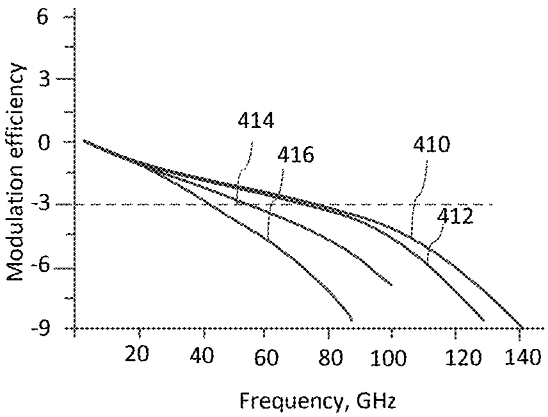
FIG. 4A is a graph illustrating an evolution of the electro-optical transfer function of an example optical modulator including a non-peaking RF driver and a TW-MZM with increasing electrical vs. optical velocity mismatch.

FIG. 4A illustrates, by way of example, the effect of an electrical-to-optical velocity mismatch on the electro-optical (EO) modulation transfer function $F_{EO}(f)$ of the driver-modulator assembly 200 with a non-peaking RF driver 250, corresponding to the EFR 310 of FIG. 3. In this example, the waveguide arms 241 of the MZM 220 have TFLN cores, the optical group index of the waveguide arms 241 $n_{os}\cong 2.2$, and the modulation length $L_{EO}\cong 0.75$ cm. The EO modulation transfer function ("modulation response") $F_{EO}(f)$ of an optical modulator device, such as e.g. the modulator assembly 200, is the ratio of a modulation depth of the optical power or phase of the output light of the modulator, e.g. light 203 at an output of the MZM 220, at a modulation frequency $f$, to an amplitude of a small-signal electrical oscillation $S_{in}(f)$ at the input to the RF driver 250 that causes the modulation of the output light. Curve 410 represents the EO modulation transfer function in the case of the ideal electrical to optical velocity matching, e.g. when $n_{es}=n_{os}=2.2$, yielding a 3 dB modulation bandwidth of about 75 GHz in this example. Curves 412, 414, and 416 represent the EO transfer functions for the example embodiments of the MZM 220 with $n_{es}=2.3$, 2.4, and 2.5 respectively, corresponding to the optical-to-electrical group index mismatch Δn of about 0.1, 0.2, and 0.3, or equivalently to the electro-optical velocity mismatch $|v_{os}-v_{es}|/v_{os}=\Delta n/n_{os}$ of about 5% (modulation response 412) to about 14% (modulation response 416). The electrical signal velocity in the MZM 200 in these examples is smaller than the optical signal velocity, as expected, e.g., for TW optical modulators with micro-structured capacitively-loaded drive electrodes disposed over a high-permittivity substrate, such as, e.g., silicon. Qualitatively similar results may be obtained for modulator PICs with the electrical signal propagation faster than the optical signal propagation, for $v_{os}<v_{es}$ and $n_{es}<n_{os}$, As can be seen from comparing the EO modulation transfer curves 410, 412, 414, and 416, the group velocity mismatch in the MZM portion of the modulator assembly 200 leads to a roll-off of the EO modulation response at high frequencies, and may reduce the modulation bandwidth of the modulator device by as much as 50% or more when the MZM is driven by an RF driver with a flat electrical frequency response function.

Figure 4B:
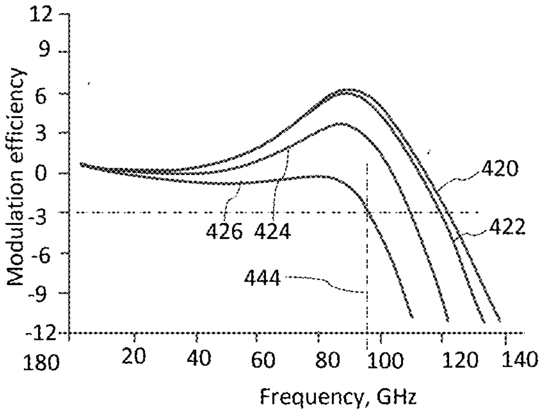
FIG. 4B is a graph illustrating an evolution of the electro-optical transfer function of an optical modulator including an RF driver having the peaking frequency response of FIG. 3, and the TW-MZM of FIG. 4A with the increasing electrical vs. optical velocity mismatch.

FIG. 4B schematically represents the EO modulation response $F_{EO}(f)$ computed for the example configurations of the MZM 220 described above with reference to FIG. 4A, when driven by a "peaking" RF driver 250 that is configured to cause the assembly 200 to have the peaking electrical frequency response 320 illustrated in FIG. 3. Curve 420 represents the EO modulation response of the modulator assembly 200 in the case of the ideal velocity matching, i.e. when $n_{es}=n_o=2.2$. Curves 422, 424, and 426 represent the EO modulation response of the assembly 200 for the example configurations of the MZM 220 with the $n_{es}$ equal to approximately 2.3 (Δn=0.1), 2.4 (Δn=0.2), and 2.5 (Δn=0.3), respectively, corresponding to the electro-optical velocity mismatch $|v_{os}-v_{es}|/v_{os}=\Delta n/n_{os}$ of about 5% to 15%. As can be seen from comparing the EO modulation response curves 416 (FIG. 4A) and 426 (FIG. 4B), configuring the RF driver 250 to have a suitably peaking electrical frequency response not only lessens the reduction of the modulation bandwidth due to the velocity-mismatched electrodes, but may even broaden the modulation bandwidth, by about 15 GHZ, or about 20% in this example, while providing an approximately monotonic EO modulation response with less than 1 dB peaking.

The ability to use strongly velocity-mismatched RF transmission lines, e.g. with the Δn≥0.2, or in a 0.3-0.7 range for some typical embodiments, in a broad-band optical modulator PIC may have several advantages. These advantages may include opening up the system design space to optimize other performance parameters of the modulator, and/or less complicated PIC fabrication processing. By way of example, velocity-mismatched TWEs may be designed to have a higher characteristic impedance, which may reduce the power consumption of the RF driver. Furthermore, the modulator PIC may be fabricated on a higher permittivity substrate, such as, e.g., a silicon substrate without substrate under-etching.

Figure 5:
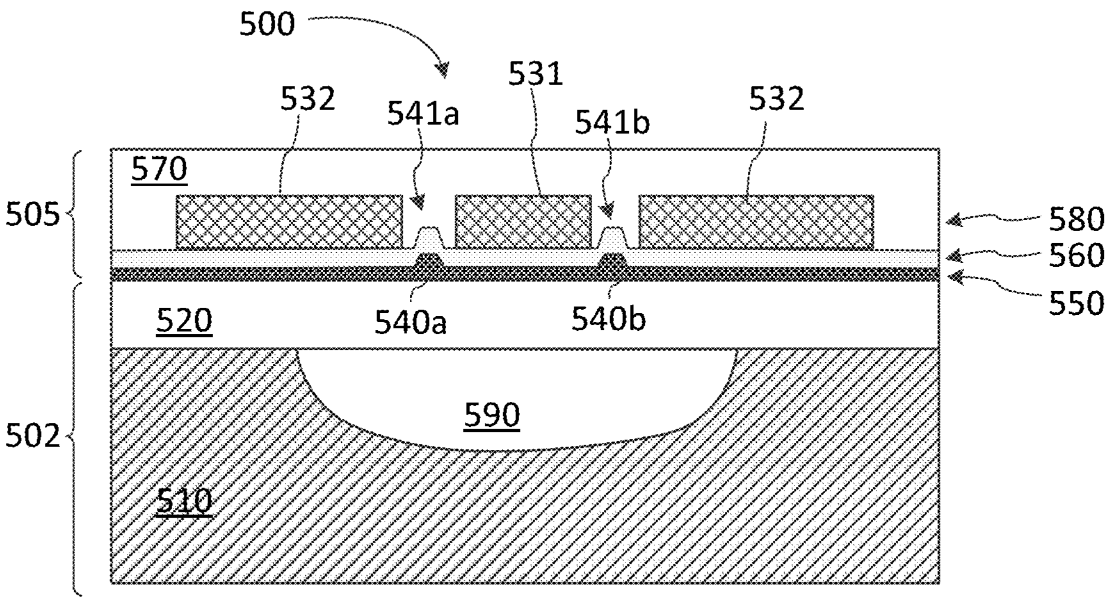
FIG. 5 is a schematic cross-section of an MZM chip with substrate undercutting for velocity matching.
Figure 11:
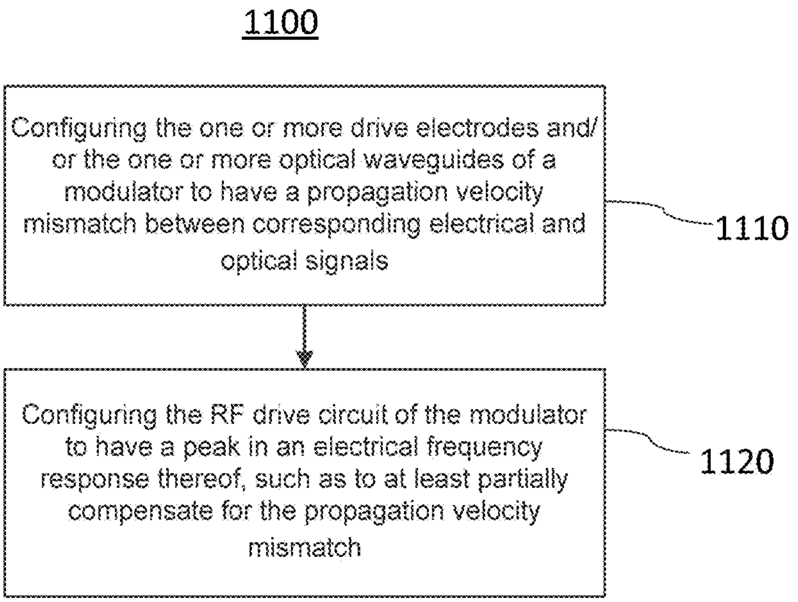
FIG. 11 is a flowchart of a method for fabricating an optical assembly including an optical waveguide modulator PIC and an RF driver IC.

FIG. 5 schematically illustrates a cross-section of a photonic chip 500 including an MZM PIC 505 over a silicon-on-insulator (SOI) substrate 502 with substrate undercutting, as used in the art for electrical-to-optical signal velocity matching. The SOI substrate 502 includes a silicon oxide layer 520, typically 1-5 μm thick, over a base silicon substrate 510. An optical layer 550, e.g. a layer of TFLN or other suitable EO material, is located upon the oxide layer 520. Ridges 540*a* and 540*b* in the EO material of the optical layer 550 form optical cores of the optical waveguides 541*a* and 541*b*. The optical waveguides 541*a* and 541*b* may be examples of the optical waveguide arms 241*a*, 241*b* of the MZM 210. In the illustrated example, the ridges 540*a* and 540*b* are so called "shallow ridges", i.e. a thinner layer of the EO material is still present away from the ridges; in other implementations, the EO material away from the ridges may be absent, e.g. removed in manufacturing, and suitable cladding material optionally deposited over the ridges 540*a* and 540*b* to form optical cores of channel optical waveguides. Metallic electrodes 531, 532 are located in a layer 580 adjacent to the sides of the optical cores 540 for electro-optically modulating light propagating in the optical waveguides 541. An optional insulation layer 560 may be disposed between the optical layer 550 and the electrode layer 580. The layer 570 may include a suitable cladding material, e.g. SiO2, disposed over the optic core layer 550 in gaps between the metallic electrodes of the layer 580. The electrodes 531, 532 may be embodiments of the electrodes 231, 232 of FIG. 2 and may form an RF transmission line for propagating an RF drive signal. In order to decrease the RF signal loss while keeping the electrode gaps suitably small, the electrodes 532, 531 may be micro-structured with periodic T-shaped capacitive loading, e.g. as illustrated in FIG. 11, which increases the effective electrical group $n_{es}$ index for the RF wave above the optical group index $n_{os}$~2.2 of the TFLN waveguides 541. The electrical-to-optical velocity matching may be achieved, e.g., by using a low-permittivity material, such as quartz, for the substrate 502 or 510. Alternatively, the velocity matching may be achieved by undercut etching the silicon substrate 510 to remove silicon in a portion 590 of the substrate 510 under the waveguide-adjacent edges of the electrodes 531, 532, thereby reducing the effective permittivity of the substrate 510 and the electrical index $n_{es}$ for the RF drive signal. However, the substrate undercut etching significantly complicates the manufacturing process of the photonic chip, while the use of a quartz substrate is not easily compatible with silicon photonics.

Figure 6:
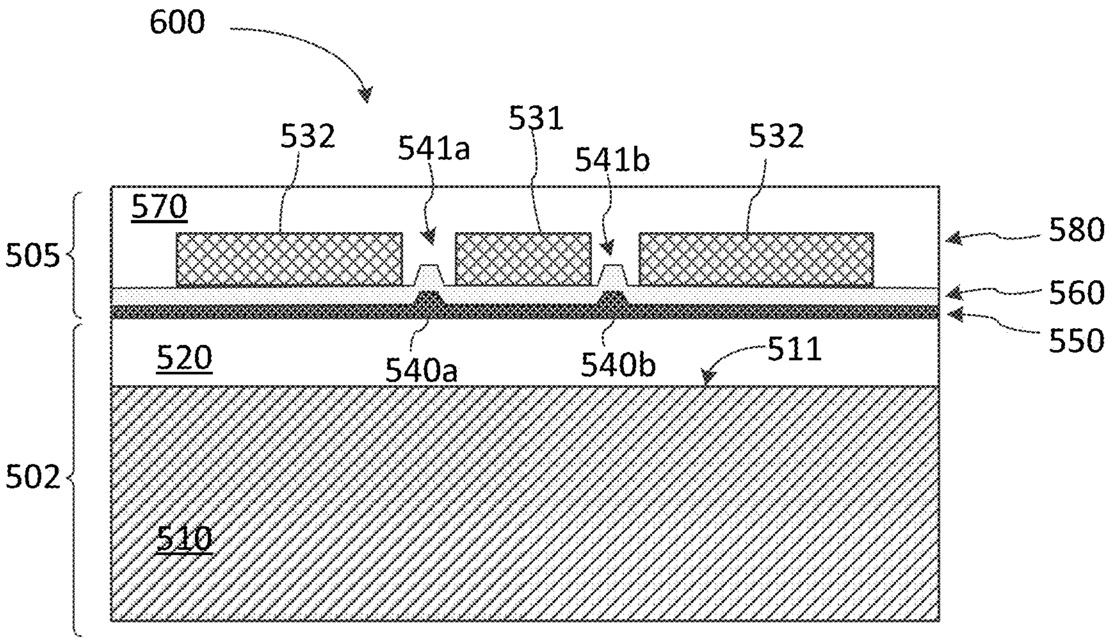
FIG. 6 is a schematic cross-section of a velocity-mismatched MZM chip without substrate undercutting.

FIG. 6 schematically illustrates a cross-section of a photonic chip 600, which is similar to the photonic chip 500, except it does not have the substrate undercut 580. In FIGS. 5 and 6, same structural features are indicated with same reference numerals. Due to the use of a high-permittivity silicon substrate and the lack of the substrate undercut, the propagation velocities of the electrical and optical signals in the MZM of chip 600 are significantly mismatched, with the group index difference Δn, being e.g., in the 0.2 to 0.7 range for some typical MZM structures with impedance-matched TWEs and low driving voltage. The effect of this velocity mismatch on the modulator bandwidth may however be at least partially offset by using an RF driver having a suitably peaking electrical frequency response, e.g. as described above with reference to FIGS. 3 and 4B. The height of the peak in the electrical frequency response of the modulator assembly may be, e.g. in a 3 to 10 dB range, or 5 to 7 dB for some typical embodiments.

Figure 7:
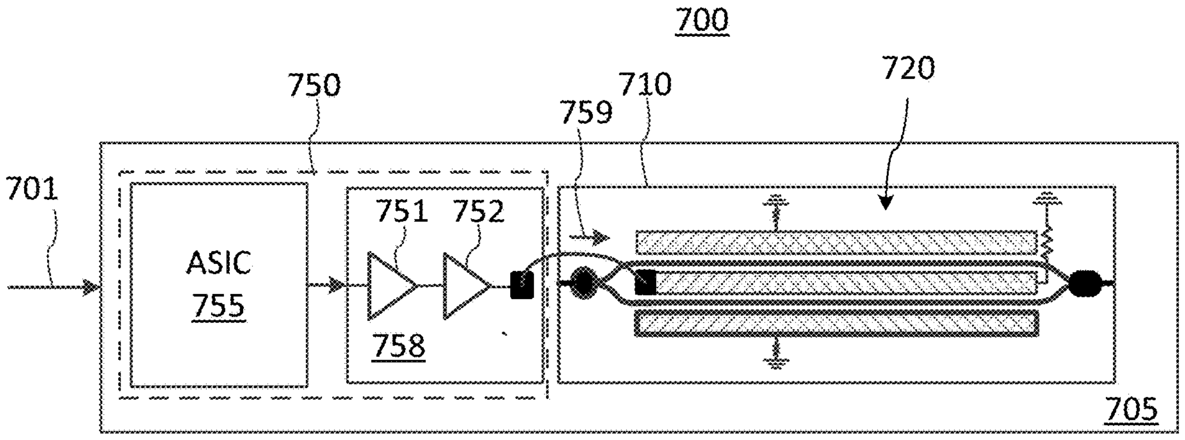
FIG. 7 is a schematic diagram illustrating a modulator assembly including an in-plane arrangement of an RF driver IC and a modulator PIC.
Figure 8:
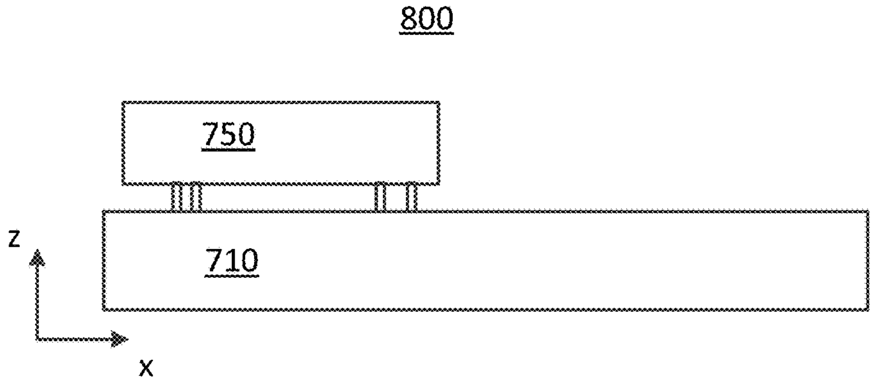
FIG. 8 is a schematic diagram illustrating a modulator assembly including a vertical arrangement of an RF driver IC and a modulator PIC.

FIGS. 7 and 8 schematically illustrate examples of an optical modulator assembly that combines an electrical drive circuit 750 with an optical modulator PIC 710 configured according to the present disclosure; those skilled in the art will appreciated that other driver-modulator assembly configurations are also possible, and may be used within the scope of the present disclosure. FIG. 7 schematically illustrates an "in-plane" type assembly 700, where the drive circuit 750 and the optical modulator PIC 710 are disposed side by side on a same PCB 705, while FIG. 8 illustrates a vertical-type assembly 800 of the RF driver IC 750 and the modulator PIC 710.

Referring to FIG. 7 for illustration, the electrical drive circuit 750 is configured to convert an input data signal 701 to a modulator drive signal 759. In the shown example, the electrical drive circuit 750 includes an ASIC 755 followed by a broad-band, typically linear, RF driver 758. The ASIC 755 may be, e.g. a separate CMOS chip. The optical modulator PIC 710 includes a velocity-mismatched TW optical modulator 720, which may be, e.g., as described above with reference to FIG. 1 or FIG. 2. In the illustrated example, the velocity-mismatched TW optical modulator 720 is an embodiment of the MZM 220 of FIG. 2. In some embodiments, the assembly 700 may include an optical source, such as e.g. a semiconductor laser (not shown), optically coupled to an optical input of the TW optical modulator 720; the laser may be mounted on a same chip with the PIC 710 or provided separately. In some embodiments, the PIC 710 may include an optical grating coupler as an optical input of the modulator. A digital to analog converter (DAC) may be connected between the ASIC 750 and the RF driver 758.

Figure 9A:
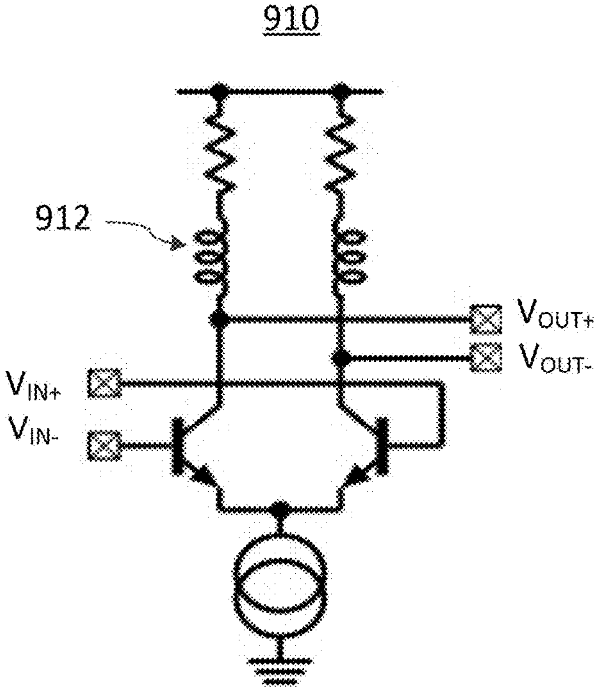
FIG. 9A is a schematic circuit diagram of an example amplification stage of an RF driver of an optical modulator with inductive peaking.
Figure 9B:
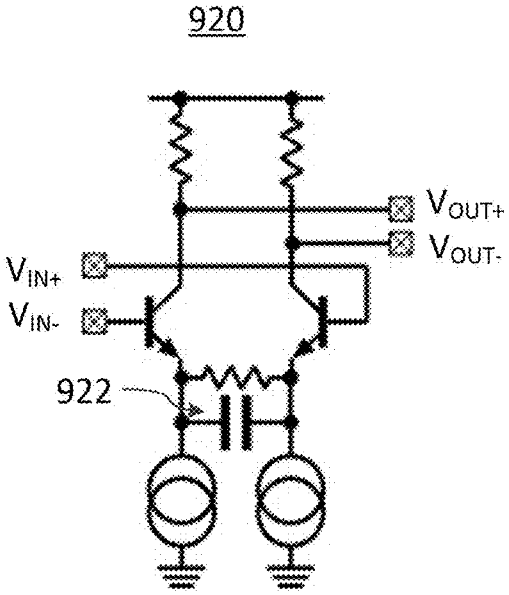
FIG. 9B is a schematic circuit diagram of an example amplification stage of an RF driver of an optical modulator with capacitive peaking.

The RF driver 758 may have a single-ended output or a differential output. The RF driver 758 typically includes two or more amplification stages, with a first amplification stage, or pre-driver, 751 and a second amplification stage 752 shown by way of example. The electrical circuit of the RF driver 758 is configured to induce a controlled high-frequency peaking in the electrical frequency response of the driver-modulator assembly, as described above. The peaking is configured so as to at least partially compensate for the electrical-to-optical velocity mismatch in the MZM 720 and to provide a substantially flat, or approximately monotonic, EO modulation response with a target bandwidth, typically defined at the 3 dB level. Different known in the art techniques may be used to provide the desired peaking EFR; these techniques include but are not limited to using inductive peaking sub-circuits at the load resistors of at least one of the amplifier stages, e.g. 751 and/or 752 (FIG. 9A), introducing deliberate impedance mismatch between the amplifying stages, e.g. 751 and 752, capacitive source/emitter degeneration in differential amplifiers (FIG. 9B), etc. Those skilled in the art will be able to design the RF driver 758 for the velocity-mismatched TW modulator 720 based on the input electrical impedance of the PIC 710, and at least one of i) an estimated amount of the velocity miss-match in the modulator 720, or ii) an expected, e.g. simulated or measured, frequency profile of the electro-optical transfer function of the modulator PIC 710. By way of example, FIG. 9A schematically illustrates an example amplification stage 910 with "peaking" inductors 912, while FIG. 9B schematically illustrates an example amplification stage 920 with a degeneration capacitance 922. The amplification stages 910 and 920, or variants thereof, may be used to implement one of the amplification stages 751 and 752 of the RF driver 758, with circuit parameters selected to cause the desired peaking response. In some embodiments, the ASIC 755 may be configured to cause the assembly 700 to have a peaking EFR.

Figure 10:
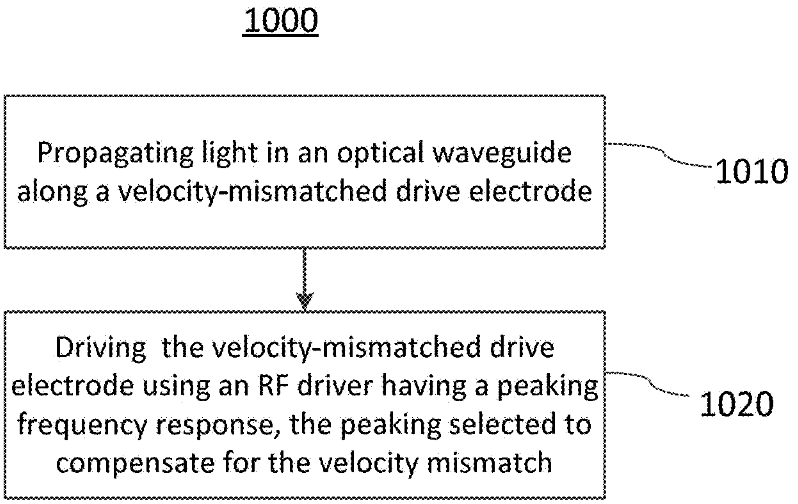
FIG. 10 is a flowchart of a method for modulating light in a modulator PIC with velocity-mismatched drive electrode (s)

Referring to FIG. 10, an aspect of the present disclosure provides a method 1000 for modulating light in an optical waveguide modulator, such as e.g. illustrated in FIG. 1 or 2. The method may include (1010) propagating the light in an optical waveguide, e.g. 140, 241*a*, or 241*b*, that extends along a velocity-mismatched RF transmission line, such as e.g. the RF transmission line 130 or 230. The method 1000 may further include (1020) driving the velocity-mismatched RF transmission line with an RF driver, e.g. 150 or 250, having a peaking electrical frequency response, such as e.g. the EFR 160 or 260, and configured to induce a controlled peaking in the EFR of a corresponding driver-modulator assembly including the RF driver electrically connected to drive the RF transmission line, such as e.g. the electrical frequency response 320 of the assembly 200. The peaking may be selected to at least partially compensate for a reduction of a modulation bandwidth of the optical modulator due to the velocity mismatch. In some implementations, the method 1000 may include propagating an RF drive signal, e.g. 153 or 253, along the optical waveguide at a group velocity $v_{es}$ that is at most 90% of a group velocity $v_{os}$ of the light in the optical waveguide, or in a range from about 85% to about 70% of the $v_{os}$ in some typical examples. The peaking may have a height, relative to a floor (e.g. 315, FIG. 3) of the frequency response, of at least 3 dB, e.g. in a range from about 3 dB to about 10 dB, or 4 to 7 dB typically. The peaking may have a height (e.g. 325, FIG. 3) selected to provide a flat electrical to optical modulation transfer function of the optical modulator, e.g. as illustrated at 424 in FIG. 4B.

Referring to FIG. 11, a related aspect of the present disclosure provides a method 1000 for configuring an optical waveguide modulator, such as e.g. shown in FIG. 1, 2, 7, or 8. The modulator comprises an RF drive circuit, e.g. 150 or 250, for generating an RF drive signal, e.g 153 or 253, and an RF transmission line, e.g. 130 or 230, for transmitting the RF drive signal along an optical waveguide, e.g. 140, 241*a*, or 241*b*, to modulate light propagating therein. The method 1100 may include step 1110 of configuring the RF transmission line to have a signal propagation velocity mismatch with the optical waveguide, and step 1120 of configuring the RF drive circuit to have a peak in an electrical frequency response thereof, and/or to induce a peak in an electrical frequency response of an assembly comprising the RF drive circuit and the RF transmission line, such as to at least partially compensate for a reduction in a modulation bandwidth B of the optical modulator due to the signal propagation velocity mismatch. In some implementations, method 1100 may include configuring the RF transmission line such that the velocity mismatch is at least 10%, or at least 20%, or at least 30%, of a group velocity of the light in the optical waveguide. In some implementations, method 1100 includes configuring the RF drive circuit such that the peak has a height of at least 4 dB. Some implementations of the method 1100 may include configuring the RF drive circuit for a given implementation of the RF transmission line so that a modulation transfer function of the optical modulator is approximately, e.g. within 1 dB, monotonic. Some implementations of the method 1100 may include configuring the RF drive circuit such that the peak is located near a high-frequency edge of a modulation bandwidth Bro of the modulator, e.g. in a frequency range from about $0.5B_{EO}$ to about $1.3B_{EO}$.

The examples of optical modulators and optical modulator assemblies described above are not intended to be limiting, and many variations will become apparent to a skilled reader having the benefit of the present disclosure. For example, optical waveguides 140, 241*a*, 241*b* may include electro-optical materials other than lithium niobate, including but not limited to other ferroelectric materials and semiconductors, e.g. silicon or compound semiconductors such as InP or GaAs alloys, which may or may not include PN junctions. In another non-limiting example, the drive electrodes of the velocity-mismatched RF transmission lines of the modulator PIC may be capacitively-loaded or micro-structured electrodes; a pair of such electrodes 1231 and 1232 extending along an optical waveguide 1240 is illustrated in FIG. 12 by way of example. The capacitive loading of such RF transmission lines, e.g. the RF transmission line 1230 of FIG. 12, slows down the propagation of the RF drive signal therealong, increasing the velocity mismatch with the optical waveguide 1240.

According to an example embodiment disclosed above, e.g., in the summary section and/or in reference to any one or any combination of some or all of FIGS. 1-12, provided is an apparatus comprising an optical modulator assembly (e.g., 100, FIG. 1; 200, FIG. 2; 700, FIG. 7; 800, FIG. 8). The optical modulator assembly comprises a substrate (e.g. 120, FIG. 1; 215, FIG. 2; 502, FIGS. 5, 6), a PIC (e.g., 110, FIG. 1; 210, FIG. 2; 505, FIG. 5; 710, FIGS. 7, 8), arranged on the substrate, and an RF drive circuit (e.g., 150, FIG. 1; 250, FIG. 2; 750, FIGS. 7, 8). The PIC comprises an RF transmission line (e.g., 130, FIG. 1; 230, FIG. 2; 1230, FIG. 12) comprising a pair of drive electrodes (e.g. 131, 132, FIG. 1; 231, 232, FIG. 2; 531, 532, FIGS. 5, 6; 1231, 1232, FIG. 12), and an optical waveguide (e.g. 140, FIG. 1; 241*a*, 241*b*, FIG. 2; 541*a*, 541*b*, FIGS. 5, 6; 1240, FIG. 12) extending between and along the drive electrodes of the pair, wherein the RF transmission line and the optical waveguide are propagation velocity mismatched. The RF drive circuit is electrically connected to drive the RF transmission line to modulate light propagating in the optical waveguide. The RF drive circuit is configured to cause the optical modulator assembly to have a peaking in an electrical frequency response thereof to compensate for a propagation velocity mismatch between the RF transmission line and the optical waveguide. The optical waveguide may comprise electro-optical material.

In some implementations, the peaking (e.g. 323, FIG. 3) occurs near a high-frequency edge (e.g. 444, FIG. 4) of a modulation bandwidth B of the optical modulator assembly.

In any of the above implementations, the peaking may have a height of at least 4 dB.

In any of the above implementations, a group index of the optical waveguide may differ from a group index of the RF transmission line by at least 0.2.

In any of the above implementations, the propagation velocity mismatch may be at least 10% of a group velocity of the light in the optical waveguide.

In any of the above implementations, the PIC may comprise an optical MZM (e.g. 220, 720) having two optical waveguide arms (e.g. 241*a*, 241*b*, FIG. 2; 541*a*, 541*b*, FIGS. 5, 6) connected to receive the light from an optical splitter (e.g. 222), one of the optical waveguide arms comprising the optical waveguide. The optical waveguide arms of the MZM may comprise electro-optical material (e.g. 550, FIGS. 5, 6). In some implementations, the electro-optic material may be thin-film lithium niobate.

In any of the above implementations, the RF transmission line may be configured such that the propagation velocity mismatch compensates for the peaking in the electrical frequency response to flatten an electro-optical modulation transfer function (e.g. 426, FIG. 4) of the assembly.

In any of the above implementations, the substrate may comprise a silicon substrate (e.g. 510, FIG. 6), and the PIC may be arranged over a planar surface (e.g. 511, FIG. 6) of the silicon substrate absent undercutting.

According to an example embodiment disclosed above, e.g., in the summary section and/or in reference to any one or any combination of some or all of FIGS. 1-12, further provided is a method for modulating light in an optical waveguide modulator (e.g. 110, 220, 720). The method (e.g. 1000, FIG. 10) comprises: propagating the light in an optical waveguide (e.g. 140, FIG. 1; 241*a*, 241*b*, FIG. 2; 541*a*, 541*b*, FIGS. 5, 6) along a velocity-mismatched RF transmission line (e.g., 130, FIG. 1; 230, FIG. 2; 1230, FIG. 12), the velocity-mismatched RF transmission line having a propagation velocity mismatch with the optical waveguide; and using an RF driver (e.g., 150, FIG. 1; 250, FIG. 2; 750, FIGS. 7, 8) having a peaking (e.g. 323, FIG. 3) in a frequency response thereof (e.g. 320, FIG. 3) to drive the velocity-mismatched RF transmission line, the peaking selected to at least partially compensate for a reduction of a modulation bandwidth of the optical modulator due to the propagation velocity mismatch. In some implementations, the method may comprise propagating an RF drive signal (e.g. 153, 253) along the optical waveguide at a group velocity $v_{es}$ that is at most 90% of a group velocity of the light $v_{os}$ in the optical waveguide. In any of the above implementations of the method, the peaking may be configured to extend the modulation bandwidth of the optical modulator by at least 10%.

According to an example embodiment disclosed above, e.g., in the summary section and/or in reference to any one or any combination of some or all of FIGS. 1-12, further provided is a method (e.g. 1100, FIG. 11) for configuring an optical modulator (e.g. 100, 200, 700, 800) comprising an RF drive circuit (e.g. 150, 250, 750) for generating an RF drive signal (e.g. 153, 253, 759), and an RF transmission line (e.g. 130, 230, 1230) for transmitting the RF drive signal along an optical waveguide (e.g. 140, 241*a*, 241*b*) to modulate light propagating therein. The method comprises: configuring the RF transmission line to have a signal propagation velocity mismatch with the optical waveguide; and configuring the RF drive circuit to have a peak (e.g. 323, FIG. 3) in an electrical frequency response thereof (e.g. 160, 320), such as to at least partially compensate for a reduction in a modulation bandwidth of the optical modulator due to the signal propagation velocity mismatch. In some implementations, the method may comprise configuring the RF transmission line such that the velocity mismatch is at least 10% of a group velocity of light in the optical waveguide. In any of the above implementations, the method may comprise configuring the RF drive circuit such that the peak has a height of at least 4 dB. In any of the above implementations, the method may comprise configuring the RF drive circuit such that a modulation transfer function of the optical modulator is substantially monotonic in frequency. In any of the above implementations, the method may comprise configuring the RF driver such that the peak is located near a high-frequency edge of a modulation bandwidth of the modulator.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims. Various features described above with reference to a specific embodiment or embodiments may be combined with other embodiments.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Furthermore in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof.

Thus, while the present invention has been particularly shown and described with reference to example embodiments as illustrated in the drawing, it will be understood by one skilled in the art that various changes in detail may be affected therein without departing from the spirit and scope of the invention as defined by the claims.

We claim:

1. An apparatus comprising:

an optical modulator assembly comprising a substrate and a photonic integrated circuit (PIC) arranged on the substrate, the PIC comprising:

an RF transmission line comprising a pair of drive electrodes; and an optical waveguide extending between and along the drive electrodes of the pair, wherein the RF transmission line and the optical waveguide are propagation velocity mismatched; and an RF drive circuit electrically connected to drive the RF transmission line to modulate light propagating in the optical waveguide;

wherein the RF drive circuit is configured to cause the optical modulator assembly to have a peaking in an electrical frequency response thereof to compensate for a propagation velocity mismatch between the RF transmission line and the optical waveguide.

2. The apparatus of claim 1 wherein the optical waveguide comprises electro-optical material.

3. The apparatus of claim 1 wherein the peaking occurs near a high-frequency edge of a modulation bandwidth B of the optical modulator assembly.

4. The apparatus of claim 1 wherein the peaking has a height of at least 4 dB.

5. The apparatus of claim 1 wherein a group index of the optical waveguide differs from a group index of the RF transmission line by at least 0.2.

6. The apparatus of claim 1 wherein the RF transmission line and the optical waveguide have a propagation velocity mismatch equal to at least 10% of a group velocity of the light in the optical waveguide.

7. The apparatus of claim 1 wherein the PIC comprises an optical Mach-Zehnder modulator (MZM) having two optical waveguide arms connected to receive the light from an optical splitter, one of the optical waveguide arms comprising the optical waveguide.

8. The apparatus of claim 7 wherein the optical waveguide arms of the MZM comprise electro-optical material.

9. The apparatus of claim 8 wherein the electro-optic material is thin-film lithium niobate.

10. The apparatus of claim 1 wherein the RF transmission line is configured such that a propagation velocity mismatch between the RF transmission line and the optical waveguide compensates for the peaking in the electrical frequency response to flatten an electro-optical modulation transfer function of the optical modulator assembly.

11. The apparatus of claim 1 wherein the substrate comprises a silicon substrate and wherein the PIC is arranged over a planar surface of the silicon substrate absent substrate undercutting.

12. A method for modulating light in an optical waveguide modulator comprising a substrate and a photonic integrated circuit (PIC) arranged on the substrate, the method comprising:

propagating the light in an optical waveguide along a velocity-mismatched RF transmission line comprising a pair of drive electrodes, the optical waveguide extending between and along the drive electrodes of the pair, the velocity-mismatched RF transmission line having a propagation velocity mismatch with the optical waveguide; and using an RF driver connected to the drive the RF transmission line to modulate light propagating in the optical waveguide, the RF driver having a peaking in a frequency response thereof to drive the velocity-mismatched RF transmission line, the peaking selected to at least partially compensate for a reduction of a modulation bandwidth of the optical modulator due to the propagation velocity mismatch.

13. The method of claim 12, comprising propagating an RF drive signal along the optical waveguide at a group velocity $v_{es}$ that is at most 90% of a group velocity of the light $v_{os}$ in the optical waveguide.

14. The method of claim 13, wherein the peaking has a height of at least 4 dB.

15. The method of claim 13, wherein the peaking is configured to extend the modulation bandwidth of the optical modulator by at least 10%.

* * * * *